March 8, 1955 E. B. JENSEN 2,703,446
TIRE RASP
Filed Oct. 28, 1953 3 Sheets-Sheet 2
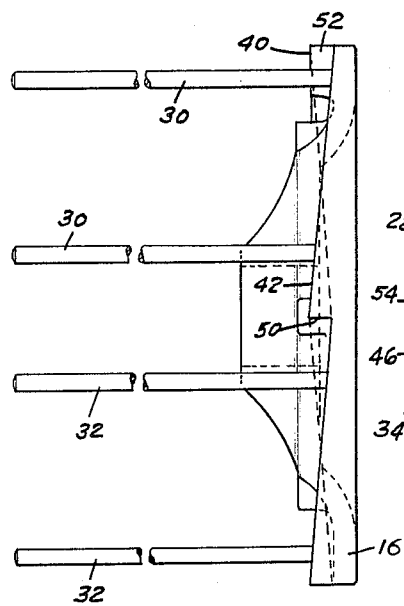
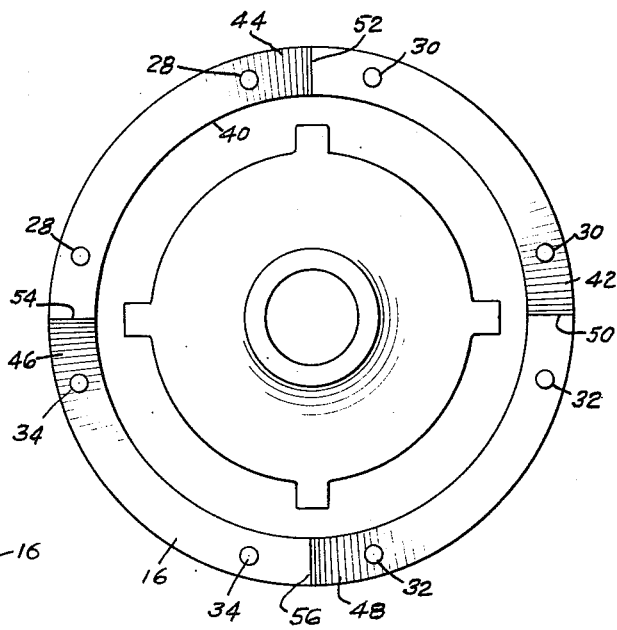
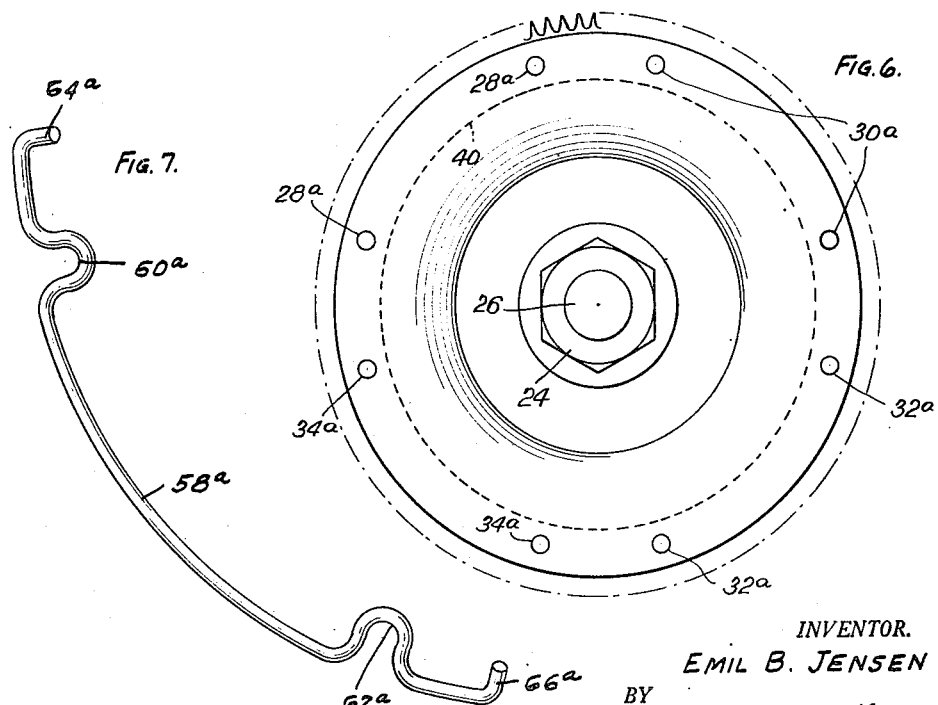
INVENTOR.
EMIL B. JENSEN
BY Harry H. Hitzeman
ATTORNEY.

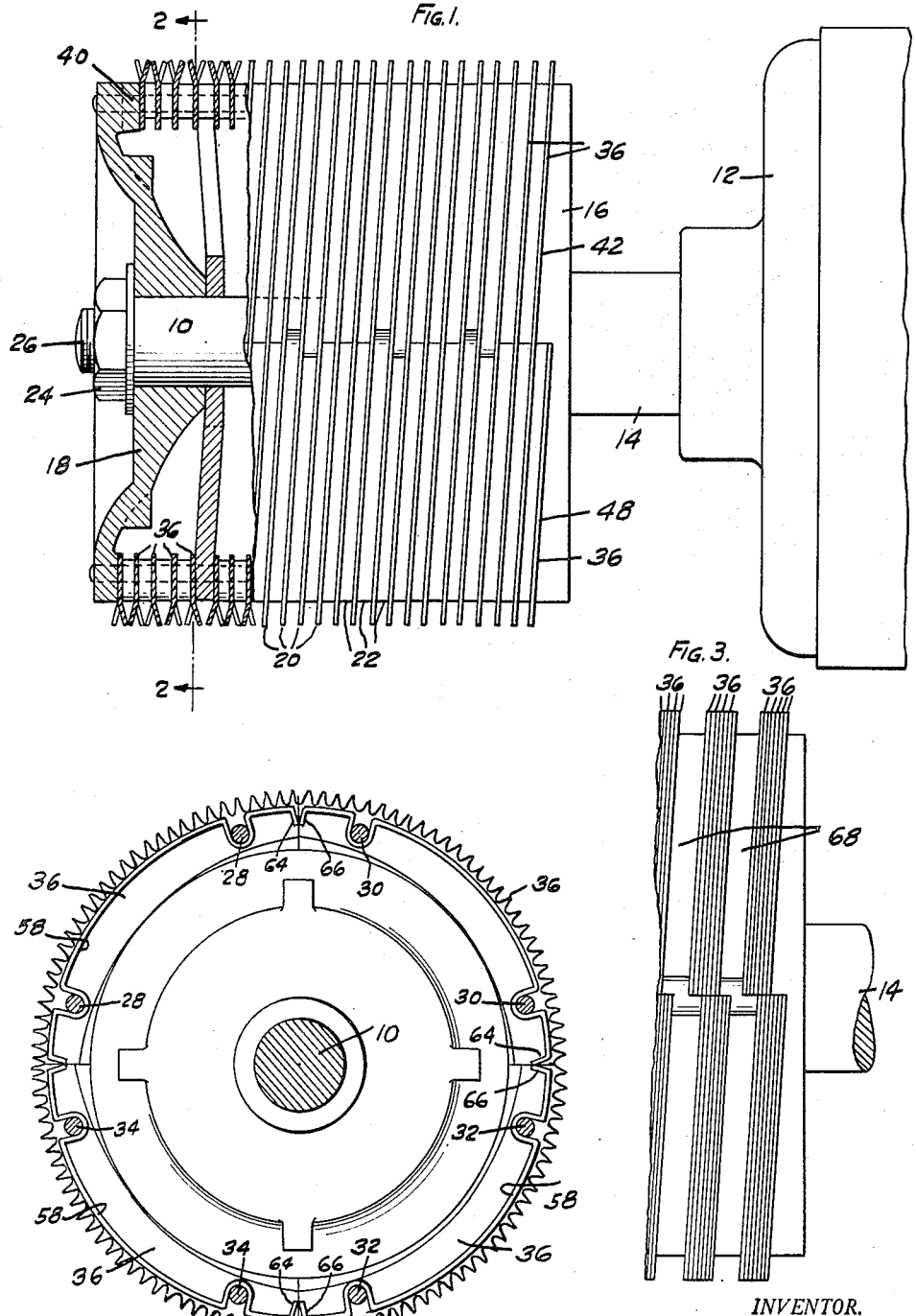

March 8, 1955 E. B. JENSEN 2,703,446
TIRE RASP
Filed Oct. 28, 1953 3 Sheets-Sheet 3
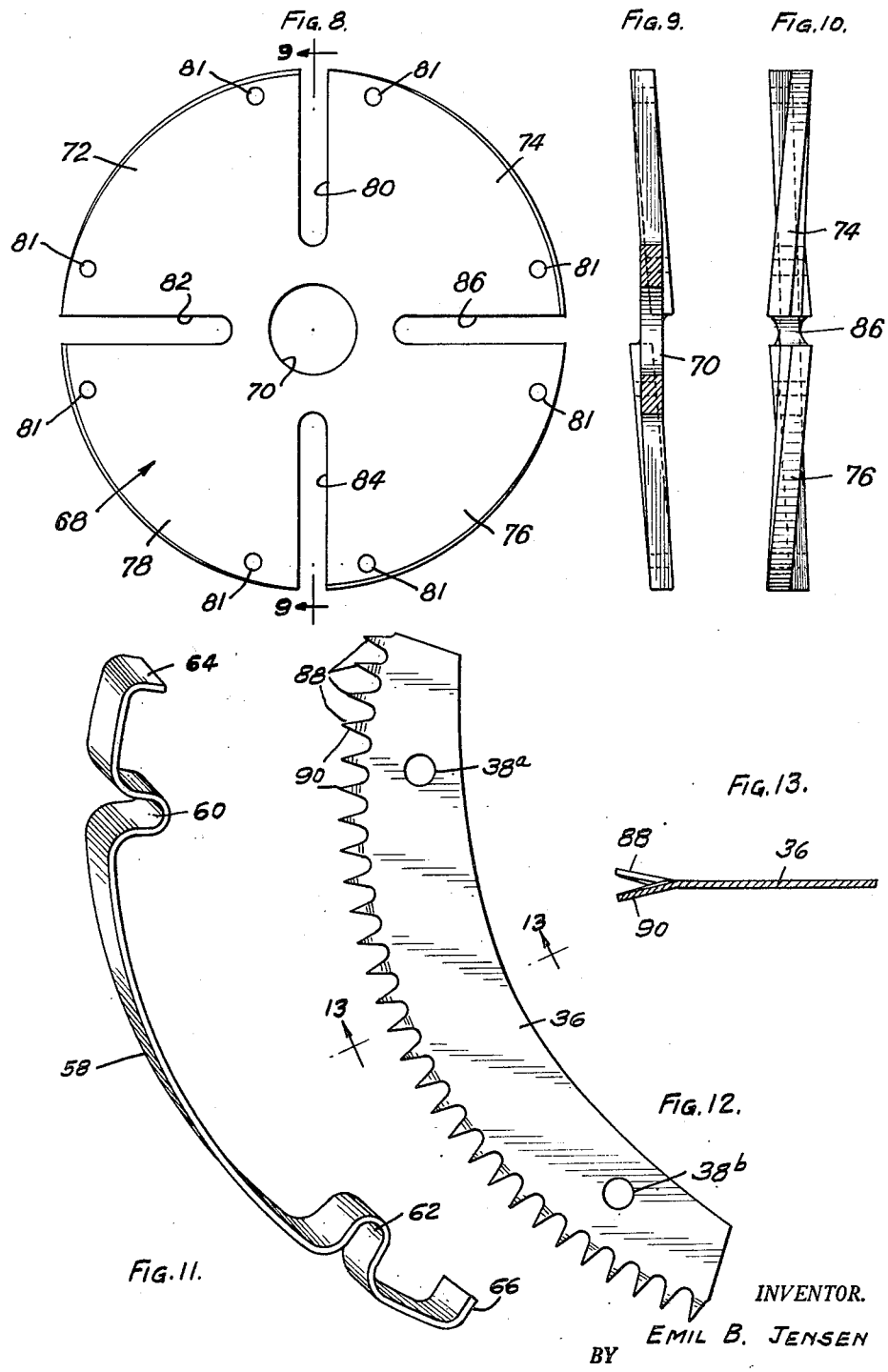
INVENTOR.
EMIL B. JENSEN
BY
Harry H. Hitzeman
ATTORNEY.

United States Patent Office 2,703,446
Patented Mar. 8, 1955

2,703,446
TIRE RASP
Emil B. Jensen, Chicago, Ill.

Application October 28, 1953, Serial No. 388,842

3 Claims. (Cl. 29—79)

The present invention relates to tire rasps or similar devices.

The invention relates more particularly to a construction of tire rasp which, due to its unique design, is adaptable to a wide range of use in the buffing or abrading of a rubber tire to prepare the tire for vulcanizing or recapping or retreading.

As is well known in the art, when the tread wears on a rubber tire and there have been no serious breaks or tears in the fibre carcass of the tire, the tire is recapped or retreaded. That is, a new rubber wear surface is applied to the body or carcass of the tire. Before this is done, however, the tire is subjected to treatment to remove, as far as possible, all old rubber and broken wire treads, and to buff or remove all this down to the cloth or fibre body of the tire. This treatment usually consists of moving the peripheral surface of a tire to be treated against a rapidly revolving tire rasp which is generally cylindrical in shape with buffing or abrading teeth on its surface. These teeth act to loosen, tear and grind off all excess old rubber on the tire carcass as well as effect a lacerated surface to the remaining tread of the tire to more easily and effectively bind to the new rubber applied in the vulcanizing or recapping operation.

Since heat is extremely high during the buffing operation and considerable pressure is required, the teeth of the rasp become broken or worn and must be replaced. Therefore it is advantageous to so design and construct the tire rasp that easy disassembly is possible to remove and replace the toothed elements.

In my improved structure presented herein I provide an assembly as a unit for mounting on the arbor or shaft of a motor, that is held together and on the arbor by a single fastening member.

An advantage of this construction lies in the fact that when removed from the arbor the unitary assembly may be dismantled by simply lifting off one end frame, the toothed members and spacers, until the entire rasp is disassembled.

A further advantage resides in the unique and novel arrangement of the toothed blades, the angle at which they are disposed, and the supports for the same, both for anchoring them about the assembly and for holding them in spaced relation.

A further advantage of my invention resides in the adaptability of this construction to group the toothed blades where extremely heavy wear is encountered, as for example when buffing a tire to take out broken and bent wire treads.

A further advantage of my invention is the provision of spring clip members which are easily mounted on the toothed blade support pins to act as spacers, unremovable during use, but easily removed when one end plate of the unit is taken off.

Other advantages and features will be more apparent as the description progresses, reference being had to the accompanying drawings, upon which:

Fig. 1 is a side elevational view of my improved tire rasp mounted upon the arbor or shaft of a motor, with parts broken in section to more clearly show other parts;

Fig. 2 is a vertical sectional view through the tire rasp taken on the line 2—2 of Fig. 1;

Fig. 3 is a fragmentary side elevational view showing groups of seven blades placed together for certain types of work;

Fig. 4 is a side elevational view of the back end plate, showing the support rods extending at right angles therefrom;

Fig. 5 is a front view of the back end plate shown in Fig. 4;

Fig. 6 is a front end elevational view of the tire rasp;

Fig. 7 is a side elevational view of one type of spacer formed of spring wire;

Fig. 8 is a front elevational view of one of the solid spacers which is employed at intervals;

Fig. 9 is a cross-sectional view thereof taken on the line 9—9 of Fig. 8;

Fig. 10 is a side elevational view thereof;

Fig. 11 is a front perspective view of a spring metal spacer of the type which I employ;

Fig. 12 is a side elevational view of one of the toothed quadrant shaped sectors which I employ; and Fig. 13 is a cross-sectional view thereof on an enlarged scale taken on the line 13—13 of Fig. 12.

The tire rasp which I have provided is adapted to be mounted upon the arbor or shaft 10 of a motor 12, the shaft having an enlarged shank 14 against which the end plate 16 of the tire rasp may be positioned, the front plate 18 being mounted at the forward end of the shaft 10. The entire ensemble includes the toothed sector rings 20 and spacers 22 fastened between the end plates by means of a nut member 24 screw-threadedly mounted upon the forward end 26 of the shaft 10.

As best shown in Figs. 1, 2, 4 and 5, the back end plate 16 of the rasp has a plurality of pairs of support pins 28, 30, 32 and 34 extending transversely therefrom, the front end plate 18 having complementary openings 28a, 30a, 32a and 34a to receive the same. The quadrant shaped segments 36 also have pairs of openings 38a and 38b so that a segment may be fastened upon any one of the sets of support pins.

The back plate and the front plate, which are identical in shape, are each provided with a peripheral shoulder 40, the shoulder 40 being provided with a plurality of quadrant shaped tapered faces 42, 44, 46 and 48, the tapered face 42 sloping away from the outer edge of the end plate 16 and terminating in an abrupt ledge 50; the tapered face 44 terminating in a similar shoulder 52, the face 46 in a shoulder 54, and the tapered face 48 in a shoulder 56. As best seen in Fig. 4, the slope of the faces is one-half the width of the end plate 16, so that quadrant shaped segments 36 placed thereon will be at an angle to the edges of the end plates 16 and 18. Thus when a plurality of the toothed segments 36 are mounted upon the pairs of support pins provided, a spiral row of cutters is provided from the front to the back plate.

For the usual type of buffing or abrading which is done with a tire rasp, I prefer to separate the spiral rows of cutters. For this purpose I have provided arcuately shaped spring clip spacing members 58 which may be of a desired width and formed with the sockets 60 and 62 to snap over a set of support pins and a pair of inwardly turned ledges 64 and 66 which frictionally engage against similar ledges of the spacer members mounted upon the other support pins. In this manner, as best shown in Fig. 2, the spacer members when placed into end-to-end engagement about the four sets of support pins, form a complete circular spacer between adjacent aligned rows of toothed blade segments 36.

To provide a more sturdy construction, I have also provided disc-shaped spacer members 68 which may be mounted at desired intervals upon the shaft 10. Each spacer 68 has an axial bore 70 and a plurality of quadrant shaped segments 72, 74, 76 and 78 formed therein and separated by the radial grooves 80, 82, 84 and 86. Suitable sets of openings 81 are provided in each segment to receive a set of the support pins previously described.

As best shown in Figs. 9 and 10, the spacers 68 are arranged with the quadrant shaped segments disposed at an angle which is complementary to the taper of the arcuate faces 42, 44, 46 and 48 of the end plates. In this manner whenever it is desired to effect a more sturdy support between the blades than is provided by the spring clip spacers, a solid disc spacer of the type shown may be interposed between parallel rows of blades.

The blade 36, as best shown in Figs. 12 and 13, is provided with peripheral tapered teeth 88 and 90, the teeth 88 being bent at an angle from the plane of the body of the blade 36 and the teeth 90 being bent to the same degree at an opposite angle. In this way a greater tearing, buffing and abrading action is obtained from a single blade and the efficiency of the rasp is greatly increased.

In the usual requirements of processors for tire rasps, I have found that it is desirable to make the rasps eight or nine inches in diameter, with spacers varying from 3/8" in width down to 1/8". For this narrow width I have provided a spacer 58a (see Fig. 7) which may be formed of spring wire with the sockets 60a and 62a formed therein to receive the support pins of the assembly. I have also provided the spring wire with the inwardly turned ledges 64a and 66a which yieldingly press against similar ledges on others to form a circular spacer between the cutter blades in position on the rasp.

With the assembly which I have provided it can be seen that when a cutter blade becomes worn or when several are worn, it is a simple matter to remove the assembly from the driving shaft 10, and by lifting off the front end plate 18 the first series of blades may be removed, then the first series of spacers, the next series of blades, etc., until all of the blades and spacers have been removed from the support rods on the back end plate.

Thus it is a simple matter to disassemble and remove and replace any worn or broken parts, and due to the quantity production that is possible in the manufacture of both the spacers and the blades, the entire assembly can be made comparatively inexpensive as compared to one in which entire cutter discs and solid spacers are employed. In addition, where it is desired to effect a different buffing or abrading action, additional blades may be spaced together between spacers, or smaller or larger spacers may be employed as desired. For example, in Fig. 13 I have shown an extreme condition wherein seven blades 36 are mounted side by side between spacers 68. Such an arrangement is sometimes necessary for the removal from extremely heavy or sturdy tires of broken wire treads which have become broken and must be removed before the tire can be recapped.

From the foregoing explanation it can be seen that I have provided an assembly of elements which are variable according to conditions, but which may be quickly and easily assembled or disassembled and changed to meet any requirements of the processing. Due to the interchangeability of the parts, it is also an easy matter to remove and replace broken spacers or blades in a minimum of time.

I contemplate that changes and modifications may be made in the exact details shown and I do not wish to be limited in any particular; rather what I desire to secure and protect by Letters Patent of the United States is:

1. An automobile tire rasp adapted to be mounted on a driven shaft to remove worn tread from tire carcasses, said rasp comprising a front and a back cylindrically shaped end plate, said back end plate having a plurality of support pins extending at right angles therefrom, said support pins arranged in pairs about the periphery of said back end plate, the front end plate having openings through which said pins extend, toothed arcuate blades mounted on pairs of support pins, spring clip spacing members mounted adjacent each toothed blade upon said support pins, said toothed blades and spacing clip members arranged in a circle about said plates so that the toothed blades form a continuous row of spiral cutters, said spring clip spacing members being formed with pairs of socket portions for mounting the same on pairs of said support pins.

2. An automobile tire rasp adapted to be mounted on a driven shaft to remove worn tread from tire carcasses, said rasp comprising a front and a back cylindrically shaped end plate, said back end plate having a plurality of support pins extending at right angles therefrom, said support pins arranged in pairs about the periphery of said back end plate, the front end plate having openings through which said pins extend, toothed arcuate blades mounted on pairs of support pins, flat spring clip spacing members mounted adjacent each toothed blade upon said support pins, said toothed blades and spacing clip members arranged in a circle about said plates so that the toothed blades form a continuous row of spiral cutters, said spring clip spacing members being formed with pairs of socket portions for mounting the same on pairs of said support pins, the facing surfaces of said front and back plates formed with inwardly tapered sloped quadrant shaped wall sections terminating in a shoulder to provide an edge support for the end blade sectors and spacing members, each shoulder being of a thickness equal to the thickness of one blade and one spacing member.

3. An automobile tire rasp adapted to be mounted on a driven shaft to remove worn tread from tire carcasses, said rasp comprising a front and a back cylindrically shaped end plate, said back end plate having a plurality of support pins extending at right angles therefrom, said support pins being concentric and arranged in pairs about the periphery of said back end plate, the front end plate having complementary openings through which said pins extend, toothed arcuate blades mounted on pairs of support pins, flat spring clip spacing members mounted adjacent each toothed blade upon said support pins, said toothed blades and spacing clip members arranged in a circle about said plates so that the toothed blades form rows of circular cutters, said front and back end plates having arcuate tapered faces whereby said rows of cutters form a continuous spiral, a plurality of blade portions when used together forming a complete circle and a plurality of juxtapositioned spring clip members forming a complete circle.

References Cited in the file of this patent
UNITED STATES PATENTS

| | | |
|---|---|---|
| 1,395,309 | Taber | Nov. 1, 1921 |
| 1,889,013 | Berner | Nov. 29, 1932 |
| 2,310,211 | Brostrom | Feb. 9, 1943 |

FOREIGN PATENTS

| | | |
|---|---|---|
| 18,351 | Great Britain | Aug. 14, 1907 |
| 122,800 | Sweden | Sept. 21, 1948 |
| 413,625 | Great Britain | Oct. 13, 1932 |